(12) United States Patent
Brown

(10) Patent No.: US 11,192,432 B2
(45) Date of Patent: Dec. 7, 2021

(54) HINGE SYSTEM FOR HARDTOP VEHICLES

(71) Applicant: Richard A Brown, Bradenton, FL (US)

(72) Inventor: Richard A Brown, Bradenton, FL (US)

(*) Notice: Subject to any disclaimer, the term of this patent is extended or adjusted under 35 U.S.C. 154(b) by 64 days.

(21) Appl. No.: 16/821,122

(22) Filed: Mar. 17, 2020

(65) Prior Publication Data
US 2021/0245590 A1 Aug. 12, 2021

(51) Int. Cl.
*B60J 7/14* (2006.01)
*B60J 7/19* (2006.01)

(52) U.S. Cl.
CPC .............. *B60J 7/146* (2013.01); *B60J 7/196* (2013.01)

(58) Field of Classification Search
CPC ....... B60J 7/1628; B60J 7/1642; B60J 7/1657
USPC .......................................... 296/107.17, 146.2
See application file for complete search history.

(56) References Cited

U.S. PATENT DOCUMENTS

| | | | | |
|---|---|---|---|---|
| 4,119,340 A * | 10/1978 | Wolfe | ..................... | B60J 7/1621 296/215 |
| 4,161,336 A * | 7/1979 | LeVan | ..................... | B60J 7/1642 296/218 |
| 4,415,197 A * | 11/1983 | Meyer | ..................... | B60J 7/1642 296/216.02 |
| 4,805,956 A * | 2/1989 | Saunders | ............... | B60J 7/1657 296/103 |
| 5,080,428 A | 1/1992 | Rouland | | |
| 5,833,300 A | 11/1998 | Russke | | |
| 6,336,674 B1 * | 1/2002 | Gerisch | ................ | B60J 1/1823 296/146.15 |
| D474,145 S | 5/2003 | Dawson et al. | | |
| 6,755,145 B2 | 6/2004 | Crane et al. | | |
| 7,240,960 B2 | 7/2007 | Fallis, III et al. | | |
| 8,991,896 B1 | 3/2015 | Whitehead | | |
| 9,346,342 B1 | 5/2016 | Bowles | | |
| 2006/0028057 A1 * | 2/2006 | Kurtz | ...................... | B60J 7/192 296/218 |
| 2017/0021705 A1 * | 1/2017 | Haberkamp | ............... | B60J 7/10 |
| 2019/0241053 A1 | 8/2019 | Desai | | |
| 2020/0164730 A1 * | 5/2020 | Willard | ..................... | B60J 7/19 |

FOREIGN PATENT DOCUMENTS

| | | | | |
|---|---|---|---|---|
| DE | 19514022 C1 * | 9/1996 | ............. | B60J 7/145 |
| DE | 102004032627 A1 * | 2/2006 | ............. | B60J 7/145 |
| DE | 102007037987 B3 * | 1/2009 | ............. | B60J 7/1642 |
| DE | 102008032688 A1 * | 1/2010 | ............. | B60J 7/143 |
| DE | 102018104606 A1 * | 9/2018 | ............. | B60J 5/0479 |
| EP | E P-0491158 A2 * | 6/1992 | ............. | B60J 7/11 |

* cited by examiner

*Primary Examiner* — D Glenn Dayoan
*Assistant Examiner* — Kevin P Weldon
(74) *Attorney, Agent, or Firm* — Bryan L. Loeffler, Esq.; Loeffler IP Group, P.A.

(57) ABSTRACT

A hinge system for a vehicle hardtop having a system with hinges (1) that allow a user to open and close a set of removable rigid rooftop panels (5, 6) for a Jeep or other sport utility vehicle without being required to fully remove and store the rigid roof panels. The hinges may be capable of supporting a partially opened position to prevent the panels from falling and slamming shut while opening.

6 Claims, 5 Drawing Sheets

HINGE SYSTEM FOR HARDTOP VEHICLES

FIELD OF THE INVENTION

This invention relates to vehicle accessories and more particularly a system with hinges that allow a user to open and close a set of removable roof top Jeep® panels without being required to fully remove and store the roof panels.

BACKGROUND OF THE INVENTION

Jeeps® and other types of sport utility vehicles (SUVs) are sold with various types of tops permitting the vehicles to be driven with fully open, partially open or fully closed formats. Many designs for rooftops of Jeep®-type vehicles have been designed in the past. Some of these designs have included bikini-type soft tops and full hard tops. These tops share the same trait of being difficult to remove and/or not providing enough protection in case of a sudden turn in weather, especially with the case of conventional hardtops that must be fully removed and are not transportable when removed.

Newer hardtop designs include removable roof panels that create an open roof between the windshield and the large rear roof panel. However, like other Jeep® tops, the removable rooftop panels must be fully removed and stored in order to enjoy the open air and this can be a difficult task especially for individuals of a smaller stature. In addition, the removed roof panels leave the interior of the Jeep® vulnerable to sudden weather changes and to theft.

Therefore, a need exists for a system with hinges that allows a user to open and close a set of removable roof top Jeep® panels without being required to fully remove and store the roof panels.

The relevant prior art includes the following references:
TABLE-US-00001 Patent No. Issue/(U.S. Patent References) Inventor Publication Date U.S. Pat. No. 5,080,428 Rouland Jan. 14, 1992 U.S. Pat. No. 5,833,300 Russke Nov. 10, 1998 U.S. Pat. No. D474,145 Dawson et al. May 6, 2003 U.S. Pat. No. 6,755,332 Crane et al. Jun. 29, 2004 U.S. Pat. No. 7,240,960 Fallis, III et al. Jul. 10, 2007 U.S. Pat. No. 8,991,896 Whitehead Mar. 21, 2015 U.S. Pat. No. 9,346,342 Bowles May 24, 2016 2019/0241053 Desai Aug. 8, 2019

SUMMARY OF THE INVENTION

The primary object of the present invention is to provide a system with hinges that allow a user to open and close a set of removable rigid rooftop Jeep® panels without being required to fully remove and store the rigid roof panels.

An additional object of the present invention is to provide a system with hinges that is adaptable to removable rooftop Jeep® panels having curved or offset edges.

An additional object of the present invention is to provide an integrated hinge system for a Jeep® with having removable panels.

The present invention fulfills the above and other objects by providing a system with hinges for use with a hardtop for Jeeps® wherein the hardtop is constructed from three modular pieces that include a base unit and two removable roof panels located above a driver seat and a passenger seat of the Jeep® when the two removable roof panels are installed and in closed positions. Normally, removable roof panels would need to be fully removed and stored inside the Jeep® or elsewhere. In contrast, the present invention further provides a system with hinges that attach the rear edge of each removable roof panel to the base unit, thereby allowing the roof panels to be folded up and back over a fixed roof panel of the base unit.

The hinges may be capable of supporting a partially opened position to prevent the panels from falling and slamming shut while opening. Such constant torque hinges may also aid those who need to open the roof panels using a two-step process. For example, a shorter user may be required to partially raise the roof panels from inside the Jeep®, leave the roof panels in a partially raised position, and then exit the Jeep® to finish folding the roof panels back onto the fixed roof panel. One or more latches are preferably located on the fixed rear roof panel of the base unit to allow the front roof panels to be locked in an open position for driving. The Hinges may be removable from the removable roof panels and/or the base unit to allow the removable roof panels to still be fully removed from the base unit if desired. The hinge system will not impede simultaneous removal of the entire hardtop if desired.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
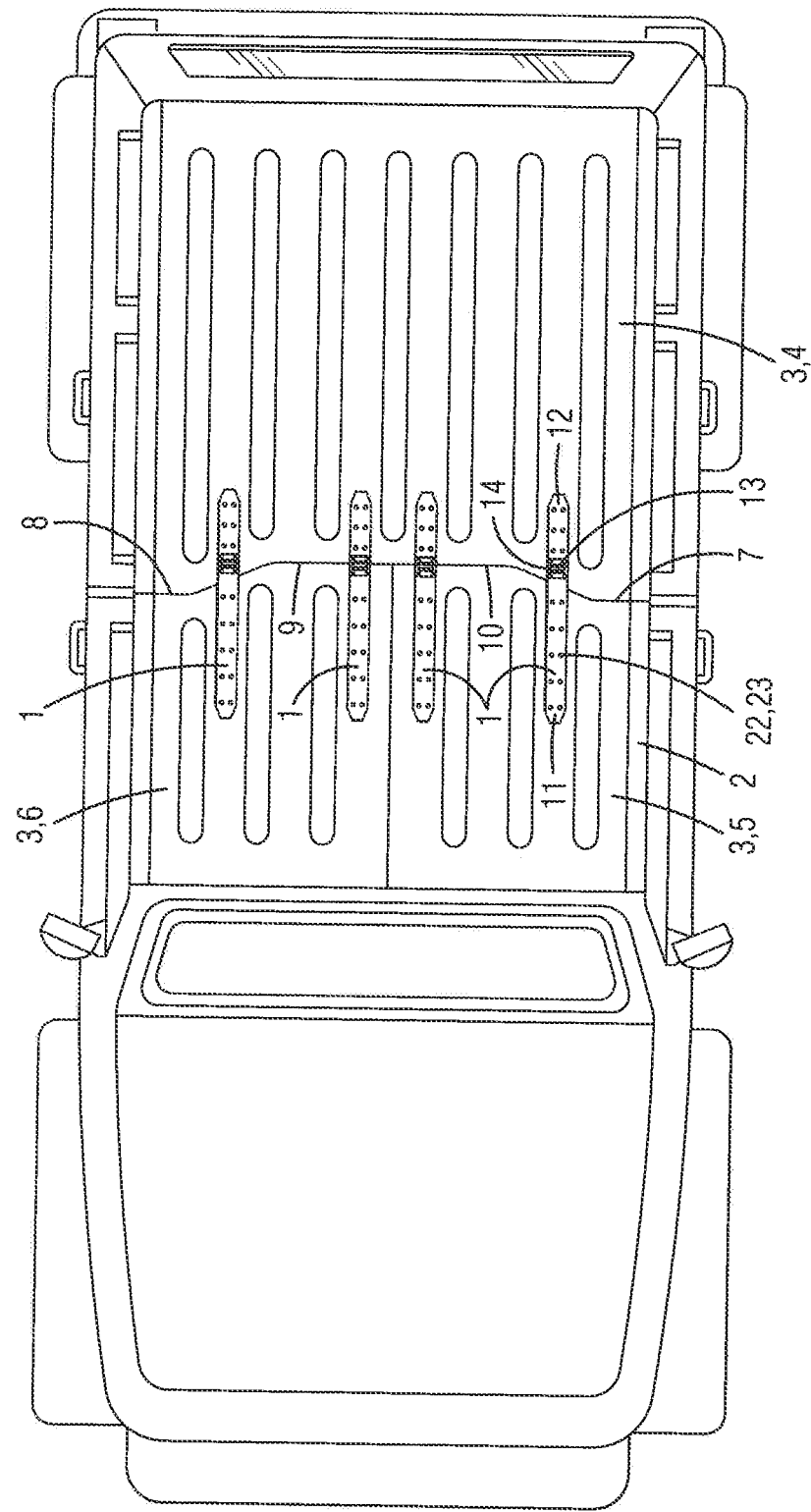
FIG. 1 is a top view of system with hinges of the present invention on a three-piece modular hardtop for a Jeep® wherein the three-piece modular hardtop is in a closed position.

For purposes of describing the preferred embodiment, the terminology used in reference to the numbered accessories in the drawings is as follows:
1. hinge, generally
2. hardtop
3. modular piece
4. base unit
5. driver side roof panel
6. passenger side roof panel
7. rear edge of driver side roof panel
8. rear edge of passenger side roof panel
9. front edge of base unit
10. seam 11. front leaf
12. rear leaf
13. barrel
14. pin
15. locking means
16. latch
17. folding latch
18. base of latch
19. arm
20. rubber pad
21. sliding latch
22. attachment means
23. bolt
24. fixed roof panel With reference to FIG. 1, a system with hinges 1 for use on a hardtop 2 for Jeeps® or other SUVs wherein the hardtop 2 is constructed from three modular pieces 3 that include a base unit 4, a driver side roof panel 5 located above a driver seat and a passenger side roof panel 6 located above a passenger seat. Some hardtops 2 may comprise a base unit 4 wherein the driver side roof panel 5 and the passenger side roof panel 6 form a single roof panel. Said driver side roof panel 5 comprises a rear edge 7 that is adjacent to a front edge 9 of the base unit 4. Likewise, said passenger side roof panel 6 comprises a rear edge 8 that is adjacent to a front edge 9 of the base unit 4. The rear edge 7 of the driver side roof panel 5, the rear edge 8 of the passenger side roof panel 6 and the front edge 9 of the base unit 4, respectively, form a seam 10. Said seam 10 may be curved, as illustrated herein. A plurality of hinges 1 attach the driver side roof panel 5 and the passenger side roof panel 6, respectively, to the base unit 4 by spanning the seam 10. The plurality of hinges 1 may be attached to the hardtop 2 via an attachment means 22, such as bolts 23, rivets, welding and so forth.

Each hinge 1 comprises an elongated front leaf 11 attached to an elongated rear leaf 12 by a barrel 13 and pin 14 that allows the font leaf 11 to be rotated in relation to the rear leaf 12. The hinges 1 are secured to the hardtop 2 so the barrels 13 of each hinge 1 are aligned on the same axis. As illustrated in FIG. 1 the seam 10 is curved, thus, at least one of the plurality of hinges 1 comprises a barrel 13 located directly above the seam 10 while at least one of the plurality of hinges 1 comprises a barrel 13 that is offset from the seam 10 and located above the base unit 4, driver side roof panel 5 or passenger side roof panel 6 depending on the curvature of the seam 10.

Figure 2:
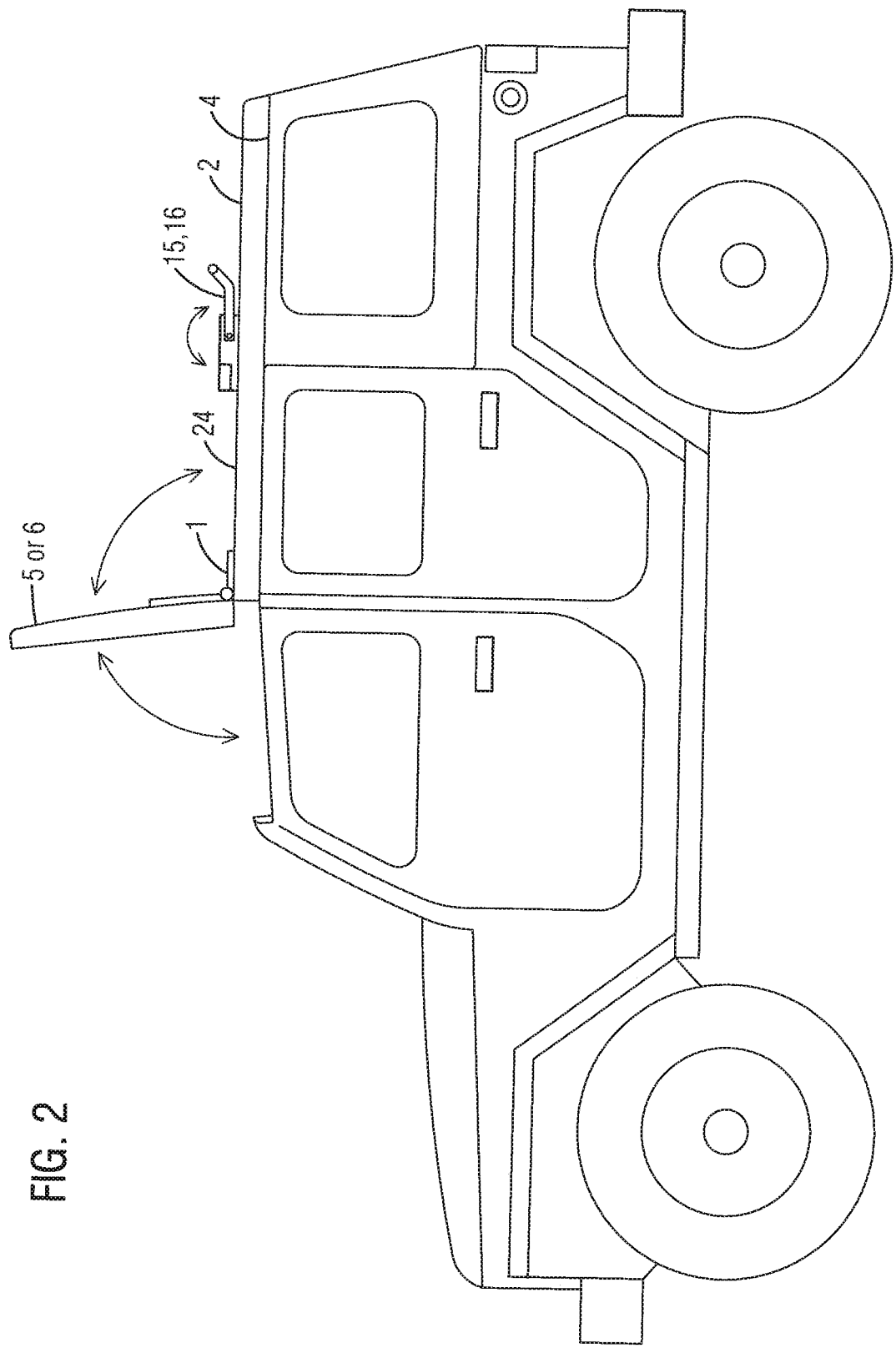
FIG. 2 is a side view of system with hinges of the present invention on a three-piece modular hardtop for a Jeep® wherein the three-piece modular hardtop is in a partially open position.
Figure 3:
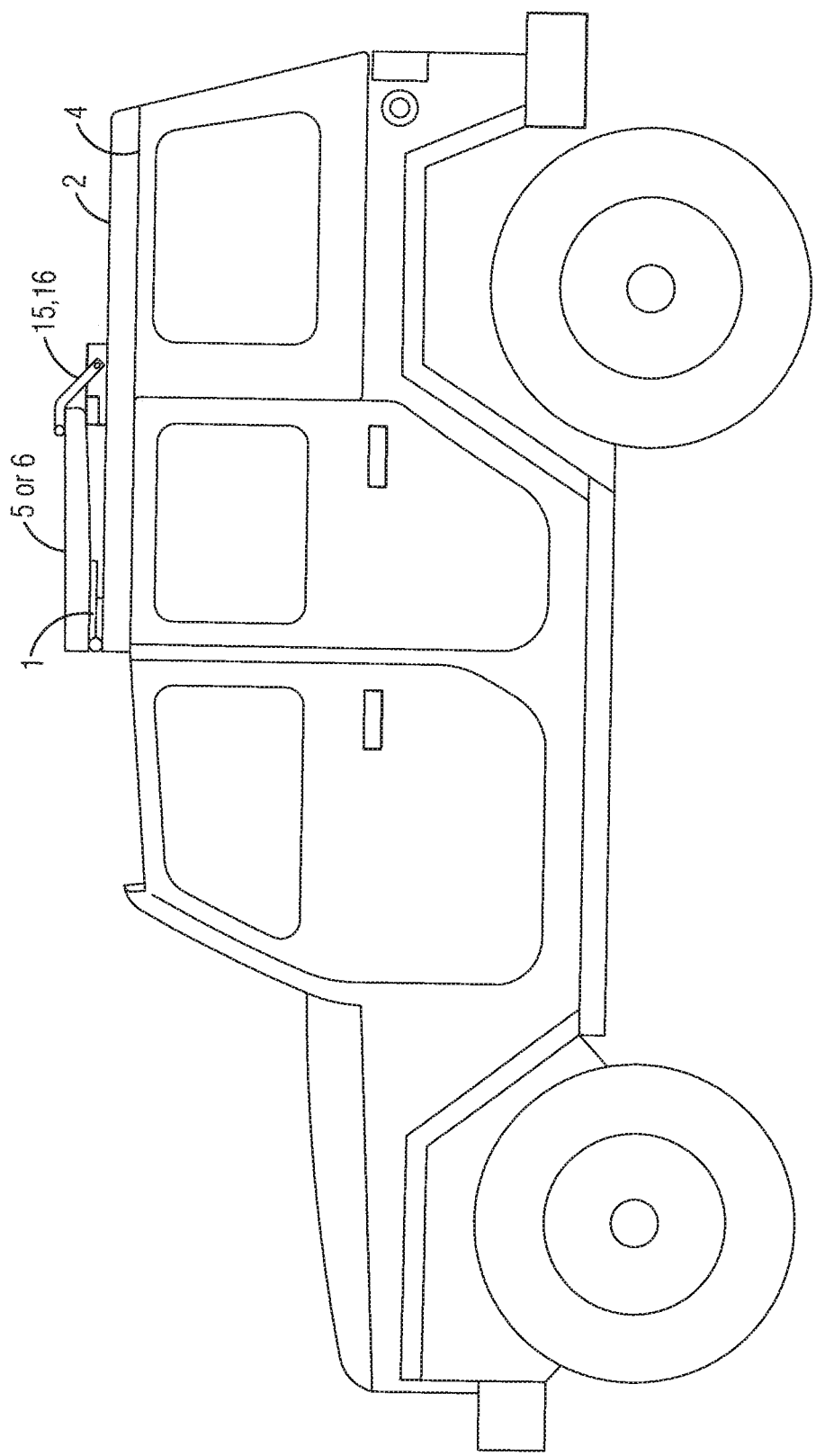
FIG. 3 is a side view of system with hinges of the present invention on a three-piece modular hardtop for a Jeep® wherein the three-piece modular hardtop is in a fully open position.

With reference to FIGS. 2 and 3, side views of hinges 1 of the present invention on a three-piece modular hardtop 2 for a Jeep® wherein the three-piece modular hardtop 2 is in a partially open position and a fully open position, respectively, are illustrated. The hinges 1 of the present invention allow a user to fold the driver side roof panel 5 or passenger side roof panel 6 up and back over a fixed roof panel 24 of the base unit 4.

The hinges 1 may be capable of a constant torque to maintain a partially open position to prevent the driver side roof panel 5 and/or passenger side roof panel 6 from falling in either direction and slamming against other objects. The constant torque hinges 1 may also aid those users who need to open the driver side roof panel 5 or passenger side roof panel 6 using a two-step process. For example, a shorter user may be required to partially raise the driver side roof panel 5 or passenger side roof panel 6 from inside the Jeep®, leave the driver side roof panel 5 or passenger side roof panel 6 in a partially raised position (as illustrated in FIG. 2), and then exit the Jeep® to finish folding the driver side roof panel 5 or passenger side roof panel 6 back onto the fixed roof panel 24 of the base unit 4 (as illustrated in FIG. 3). One or more locking means 15, such as a latch 16 and so forth, are preferably located on the fixed roof panel 24 of the base unit 4 to allow the driver side roof panel 5 and/or passenger side roof panel 6 to be locked in fully open positions for driving.

Figure 4:
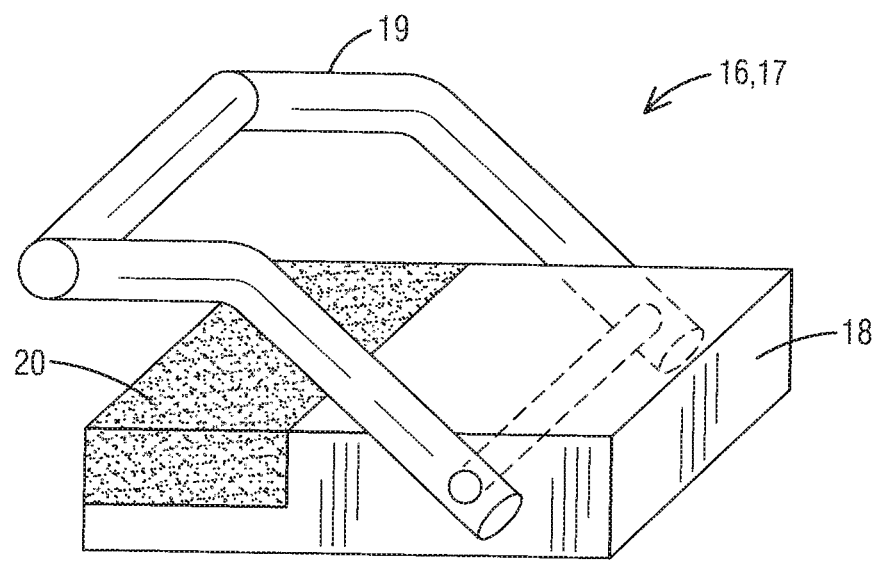
FIG. 4 is a top perspective view of a folding latch of the present invention.
Figure 5:
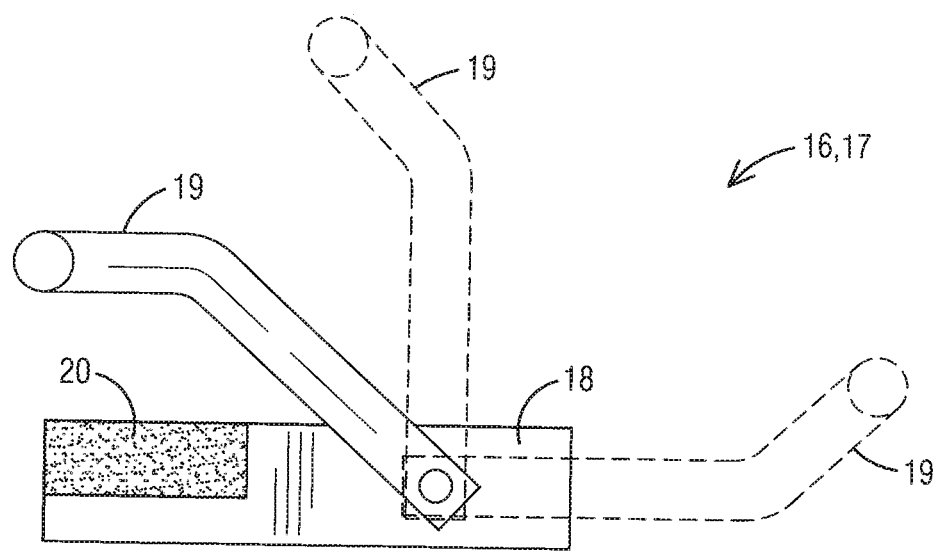
FIG. 5 is a side view of a folding latch of the present invention.

With reference to FIGS. 4 and 5, a top perspective view and side view, respectively, of a folding latch 17 of the present invention are illustrated. The latch 16 of the present invention may be a folding latch 17 comprising a base 18 that is attached to the fixed roof panel 24 of the base unit 4 wherein an arm 19 is pivotally attached to the base 18 to allow the arm 19 to be placed over the driver side roof panel 5 or of the passenger side roof panel 6 when placed in a fully open position as illustrated in FIG. 3. A rubber pad 20 may be located on the base 18 to provide a soft surface for the driver side roof panel 5 or of the passenger side roof panel 6 to rest on when in fully open positions.

Figure 6:
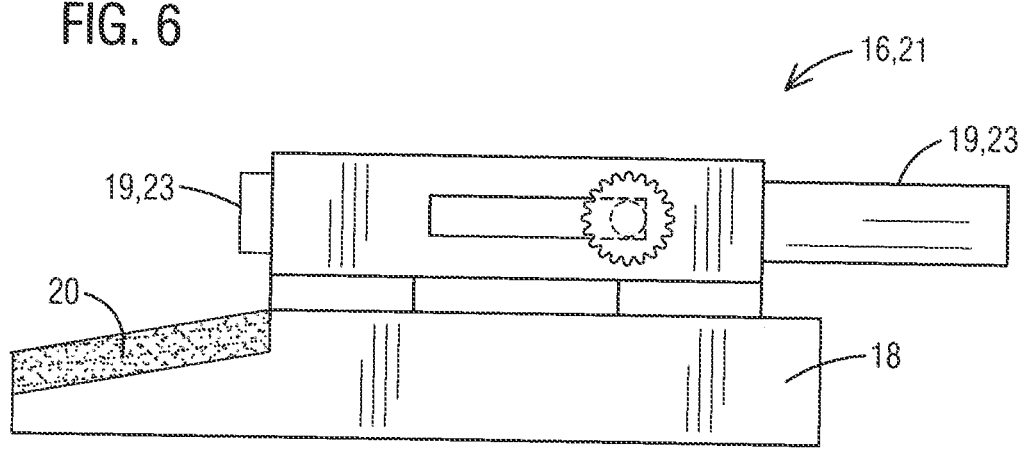
FIG. 6 is a side view of a sliding latch of the present invention in an open position.
Figure 7:
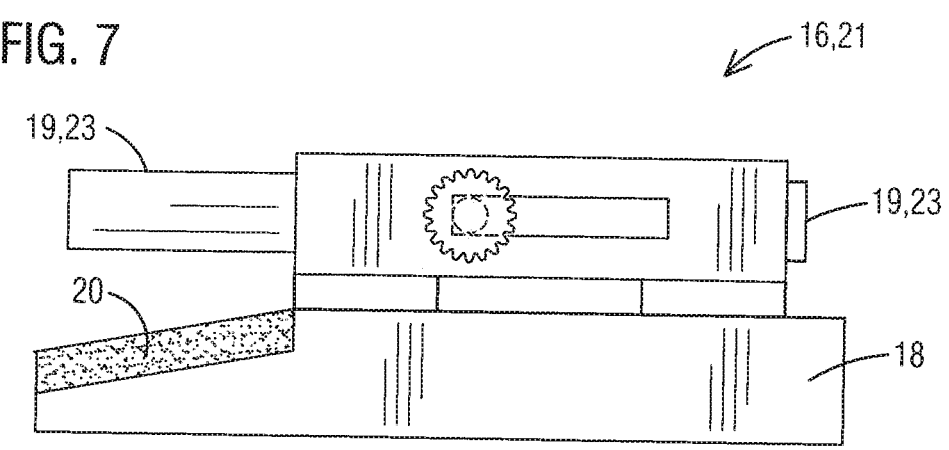
FIG. 7 is a side view of a sliding latch of the present invention in an engaged position.

With reference to FIGS. 6 and 7, side views of a sliding latch 21 of the present invention in an open position and in an engaged position, respectively, are illustrated. The latch 16 of the present invention may be a sliding latch 21 comprising a base 18 that is attached to the fixed roof panel 24 of the base unit 4 wherein an arm 19 or slide bolt retractably extends over an edge and/or a portion of the base 18 wherein a rubber pad 20 may be located to provide a soft surface for the driver side roof panel 5 or of the passenger side roof panel 6 to rest on when in fully open positions.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A hardtop for a sport utility vehicle comprising: a base unit having a rear roof panel; said rear roof panel having a front edge; a driver side roof panel and a passenger side roof panel that cover a driver side seat and passenger side seat, respectively, of a sport utility vehicle when installed thereon; said driver side roof panel having a rear edge that forms a seam with said front edge of said rear roof panel; said passenger side roof panel having a rear edge that forms a seam with said front edge of said rear roof panel; at least one hinge securing the driver side roof panel to the rear roof panel so that said driver side roof panel is capable of folding back onto said rear roof panel; at least one hinge securing the passenger side roof panel to the rear roof panel so that said passenger side roof panel is capable of folding back onto said rear roof panel; and said seam located between said driver side roof panel and said rear roof panel and said seam located between said passenger side roof panel and said rear roof panel form a single seam that is a curved seam.

2. The hardtop for a sport utility vehicle of claim 1 further comprising: at least one locking means located on said rear roof panel for securing said driver side roof panel in a fully open position; and at least one locking means located on said rear roof panel for securing said passenger side roof panel in a fully open position.

3. The hardtop for a sport utility vehicle of claim 2 wherein: said at least one locking means located on said rear roof panel for securing said driver side roof panel in a fully open position is a latch; and said at least one locking means located on said rear roof panel for securing said passenger side roof panel in a fully open position is a latch.

4. The hardtop for a sport utility vehicle of claim 2 wherein: said at least one locking means located on said rear roof panel for securing said driver side roof panel in a fully open position is a folding latch; and said at least one locking means located on said rear roof panel for securing said passenger side roof panel in a fully open position is a folding latch.

5. The hardtop for a sport utility vehicle of claim 2 wherein: said at least one locking means located on said rear roof panel for securing said driver side roof panel in a fully open position is a sliding latch; and said at least one locking means located on said rear roof panel for securing said passenger side roof panel in a fully open position is a sliding latch.

6. The hardtop for a sport utility vehicle of claim 1 wherein: a plurality of hinges attaching the driver side roof panel and the passenger side roof panel to the base unit by spanning said curved seam; each hinge having a front leaf attached to a rear leaf by a barrel; the barrels of each hinge being aligned on a single axis; at least one of the plurality of hinges having a barrel located directly above the curved seam; and at least one of the plurality of hinges having a barrel that is offset from the curved seam.

\* \* \* \* \*